Aug. 27, 1935.   C. C. FARMER ET AL   2,012,743
FLUID PRESSURE BRAKE
Filed July 7, 1932
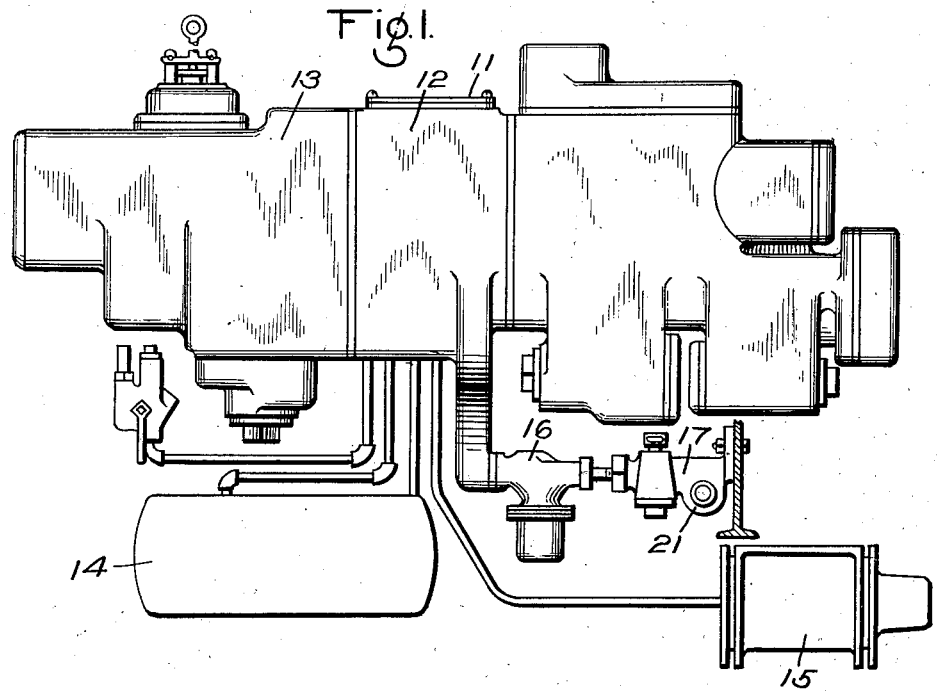
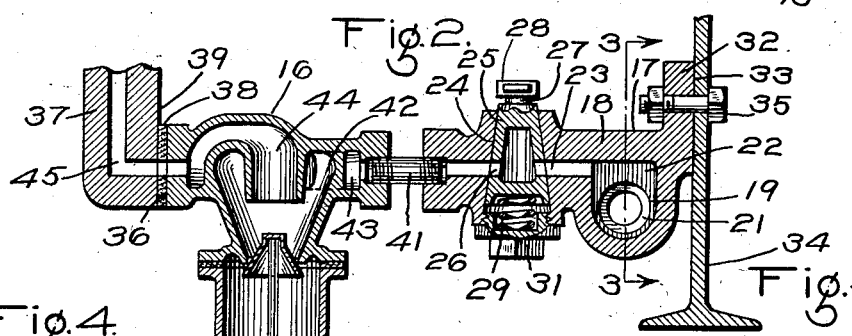
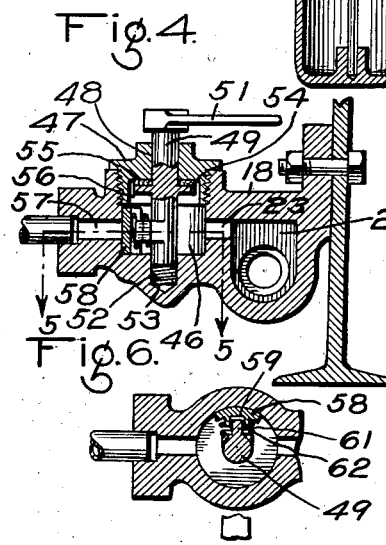
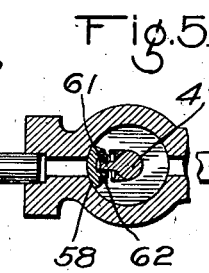
INVENTORS
CLYDE C. FARMER
CARLTON D. STEWART
By Wm. M. Cady
ATTORNEY.

Patented Aug. 27, 1935

2,012,743

UNITED STATES PATENT OFFICE 2,012,743

FLUID PRESSURE BRAKE

Clyde C. Farmer, Pittsburgh, Pa., and Carlton D. Stewart, Berkeley, Calif., assignors to The Westinghouse Air Brake Company, Wilmerding, Pa., a corporation of Pennsylvania Application July 7, 1932, Serial No. 621,236

3 Claims. (Cl. 303—88)

This invention relates to fluid pressure brake equipment and particularly to the branch pipe T and appurtenances connected in the branch pipe between the brake pipe and the brake controlling valve device.

Heretofore it has been the practice to mount the triple or brake controlling valve device upon a vehicle at a point remote from the brake pipe and to connect it to the branch pipe T on the brake pipe by means of a branch pipe including a dirt collector and a separate cut-out valve device and connected pipe section. The branch passage thus constituted, contained a number of threaded pipe sections and fittings which add to the length of the branch passage. It has been found that relatively long and tortuous branch passages retard the flow of fluid and thus the operation of the brake equipment and materially interfere with the desired rapid operation of the quick action devices for effecting serial quick application of the brakes throughout the train.

An object of the invention is to provide a branch pipe having the pipe T, cut-out valve device and dirt collector, so associated that they constitute a compact assembled unit having a relatively short and direct passage for fluid and wherein the number of pipe connections and fittings are reduced by providing a dirt collector that may be directly connected to the brake controlling valve device and a combined branch pipe T and cut-out valve which also constitutes a support for the brake pipe.

A further object of the invention is to provide a branch pipe unit having the above noted characteristics wherein the dirt collector and branch pipe T may be assembled and handled as a unit and applied between parallel plane faces of the brake controlling valve device and a part on the vehicle by movement in the direction of the planes of said faces, thereby enabling removal and replacement of the branch pipe unit without necessitating bodily movement of the brake controlling valve device.

A further object of the invention is to provide a cut-out valve device in the branch pipe between the brake pipe and the brake controlling valve device that will insure one brake application in the event that the cut-out valve is unintentionally allowed to remain closed and with the brake controlling valve charged. The brakes associated with the brake controlling valve device having the closed cut-out valve will not release when the brake valve is turned to release position, and this fact will direct attention to the closed cut-out valve.

These and other objects of the invention that will be made apparent throughout the further description thereof are attained by means of the apparatus hereinafter described and illustrated in the accompanying drawing, wherein:

Fig. 1 is an elevational view of a fluid brake equipment embodying features of the invention;

Fig. 2 is a sectional view of a portion of the apparatus shown in Fig. 1, showing the branch passage assembly;

Fig. 3 is a sectional view partially in elevation of a pipe T constituting a part of the branch passage assembly, the section being taken on the line 3—3 of Fig. 2;

Fig. 4 is a sectional view of a modified form of pipe T and cut-out valve device; and Figs. 5 and 6 are fragmental sectional views of the cut-out valve shown in Fig. 4, the sections being taken on the line 5—5 of Fig. 4 and showing the cut-out valve in closed and open positions respectively.

Referring to the drawing, the improved branch passage unit is shown as applied to a type of brake controlling valve device and associated apparatus which comprises a valve device 11 having a pipe bracket casting 12, upon one side of which a service application valve device 13 is attached and upon the other side of which an emergency application valve device is also attached, an auxiliary reservoir 14, a brake cylinder 15, a dirt collector 16, and a combined branch pipe T and cut-out valve device 17.

Referring to Fig. 2, the combined branch pipe T and cut-out valve device 17 comprises a casing 18 having a bore 19 extending therethrough for receiving the aligned threaded ends of the brake pipe sections 21. A chamber 22 is provided in the casing between the ends of the bore 19 and which extends vertically and communicates with a passage 23 in the casing 18. Fluid under pressure flowing from the brake pipe 21 is caused to flow upwardly through the chamber 22 in order to pass to the passage 23 through which fluid flows from the brake pipe to the brake controlling valve device 11. There is, therefore, less tendency for dirt and foreign particles in the brake pipe to flow upwardly into the branch passage.

A valve chamber 24 extends from one side of the casing 18 to the other and is tapered for receiving a tapered plug valve 25 having a port 26 extending therethrough and the valve may be adjusted to register, when in open position, with the passage 23 for permitting the flow of fluid under pressure from the brake pipe to the dirt collector 16. The port 26 is so arranged that when the plug valve 24 is turned through 90 degrees the port 26 is out of registry with the passage 23 and the plug valve closes said passage.

The tapered plug valve is provided with a stem 27 which extends exteriorly of the casing 18 and a handle 28 is secured to the stem so that the valve may be manually moved to open and closed position. The valve plug is yieldingly maintained in operative position in the tapered chamber 24 by a spring 29 interposed between the inner end of the plug valve and a nut 31 threaded into the casing.

The pipe T casing is provided with an integral bracket 32 having a flat face 33 for engaging the web of an I-beam which constitutes a part of the vehicle frame. The bracket is secured to the frame part by means of a bolt 35.

The centrifugal dirt collector 16 is of the usual standard type except that it is provided with a flat attaching face 36 which is adapted to be secured to an extension 37 of the pipe bracket 12 with a packing gasket 38 interposed between the attaching face 39 of the extension 37 and the flat face 36 of the dirt collector 16. The dirt collector is attached to the pipe bracket extension by means of bolts not shown.

The dirt collector 16 and the pipe T casing 18 are connected by a threaded pipe nipple 41 and when thus joined constitutes a branch passage unit or assembly which may be handled or shipped as a unit and assembled on a vehicle between the plane faces of the pipe bracket extension 37 and the I-beam 34 by movement laterally into operative position as shown in Fig. 2.

Fluid under pressure flows from the brake pipe 21 through chamber 22, passage 23, port 26 in the plug valve 25, pipe nipple 41 and into the frusto-conical dirt collector chamber 42 through passage 43 in the dirt collector casing 16. Fluid flows from the chamber 42 through passage 44 to passage 45 leading to the piston chambers, not shown, of the service and emergency application valve devices.

From the foregoing, it is apparent that a simple branch passage unit is provided which affords a short and direct passage for fluid under pressure flowing from the brake pipe to the brake controlling valve device, and that the passage is of minimum volume.

In Figs. 4, 5 and 6, a branch pipe T having a modified cut-out valve construction is shown. The modified cut-out valve device comprises the pipe T casing 18 having a valve chamber 46 that is closed by a threaded nut 47 having an opening 48 through which a valve stem 49 extends exteriorly of the casing 18. The stem 49 is provided with an operating handle 51 by means of which the stem is rotated. The inner end of the stem 49 is supported in a bearing recess 52 in the casing 18 and a spring 53, interposed between the end of the bearing recess 52 and the inner end of the stem 49, serves to press the stem outwardly so that the flange 54 on the stem engages a packing washer 55 supported in a recess 56 in the nut 47, for preventing leakage of fluid past the flange and through the opening 48 in the nut. Communication is established between the valve chamber 46 and the pipe T chamber 22 through a passage 23 and the casing 18 is provided with a passage 57 which opens into the chamber 46 and which is adapted to be closed by a segment valve 58 that is adapted to be operated by the valve stem 49 when the latter is rotated. The segment valve 58 is provided with a recess 59 for receiving a lug 61 which extends radially from the valve stem 49 and which serves to move the segment valve 58.

The segment valve is yieldingly pressed into engagement with the cylindrical seat formed by the cylindrical wall of the chamber 46 by a spring 62 that is interposed between the stem 49 and the segment valve 58 as indicated in Figs. 5 and 6, which show respectively the closed and open position of the valve.

This form of segment valve is disclosed in the copending application for patent, Serial No. 621,197, filed July 7, 1932, by Carlton D. Stewart, and assigned to the assignee of this application, and no claim is made for the specific valve construction herein disclosed. However, this form of valve is particularly well adapted for use as a cut-out valve in a branch passage of a train brake system for the reason that the valve is yieldingly pressed against its seat and may, when the brake pipe pressure is reduced a predetermined degree below the pressure in passage 57, permit the passage of fluid under pressure from the passage 57 to the valve chamber 46 for effecting an application of the brakes when the valve is in closed position. By reason of this feature, in the event that the cut-out valve is unintentionally allowed to remain in closed position, a reduction in brake pipe pressure for effecting an application of the brakes of the train will so reduce the pressure in the chamber 46 that the higher pressure in the passage 57 which is connected to the brake controlling valve device, assuming the brake controlling valve device to be charged, will overcome the tension of the spring 62 and permit the brake controlling valve device to function once even though the cut-out valve is closed. The segment valve 58 will, however, prevent subsequent charging of the brake controlling valve device and release of the associated brakes, and it will be necessary for the trainman to manually move the segment valve to open position shown in Fig. 6 in order to release the brakes and obtain subsequent operation of the brakes controlled by the brake controlling valve device.

While but two embodiments of the invention are disclosed, it is obvious that changes, omissions and additions may be made to the branch passage construction disclosed without departing from the spirit of the invention.

Having now described our invention, what we claim as new and desire to secure by Letters Patent, is:

1. The combination with a brake pipe, a brake controlling valve device operative upon a reduction in fluid pressure for effecting an application of the brakes, and a branch pipe establishing communication from the brake pipe to said valve device, of a manually operable cut-out valve device for closing said communication and operable by fluid under pressure acting on the brake controlling valve side of said cut-out valve device to open said communication when the brake pipe pressure is reduced below that acting on said valve device.

2. The combination with a brake controlling valve device, a brake pipe for supplying fluid under pressure to said valve device and a branch connection establishing communication from said brake pipe to said valve device, of a manually operable valve device for closing said communication and operable in the closed position by fluid under pressure acting on the brake controlling valve device side of said manually operable valve device when the fluid pressure in said brake pipe is reduced a predetermined degree below that acting on said controlling valve device, for venting fluid under pressure from said brake controlling valve device to effect an application of the brakes.

3. A branch pipe T comprising a casing having a bore for receiving the threaded ends of brake pipe sections and having a valve chamber communicating with said bore through a branch passage adapted to be connected to a brake controlling valve device, and a manually operable valve in said chamber for controlling said branch passage, said valve being yieldingly held upon its seat and adapted to be opened by fluid pressure acting on the brake controlling valve side of said manually operable valve when the pressure therein exceeds that in said chamber a predetermined degree.

CLYDE C. FARMER.
CARLTON D. STEWART.